3,640,998
ALKYLENE OXIDE ADDUCTS OF ALKYL OLIGO-
SACCHARIDES AND THEIR MIXTURES WITH
ALKYLENE OXIDE ADDUCTS OF BOTH ALKYL
GLUCOSIDES AND ALKANOLS
Richard C. Mansfield, Dersher, and James L. Rainey,
Abington, Pa., assignors to Rohm and Haas Company,
Philadelphia, Pa.
No Drawing. Filed June 18, 1969, Ser. No. 834,558
Int. Cl. C07c 47/18
U.S. Cl. 260—210 R                    10 Claims

ABSTRACT OF THE DISCLOSURE

Surface active alkylene oxide adducts of alkyl oligosaccharides, and alkylene oxide adducts of mixtures of alkyl oligosaccharides, alkyl glucosides and alkanols, are prepared from an alkanol and glucose via a transacetalation reaction, followed by oxyalkylation. Preparation of these compositions may be carried out by reacting glucose and a lower alkanol in the presence of an acid catalyst to form a mixture of lower alkyl glycosides and alkyl oligosaccharides which are then reacted with higher alkanols to form the desired intermediates, followed by incorporation of ethylene and/or propylene oxides into the components of the mixture.

---

This invention relates to surface active alkylene oxide adducts of alkyl oligosaccharides, and alkylene oxide adducts of mixtures of alkyl oligosaccharides, alkyl glucosides, and alkanols, as well as processes for their preparation.

In particular, the invention is concerned with the preparation of alkyl oligosaccharide mixtures whose components have the structure

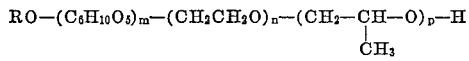

where R is selected from the group consisting of aliphatic hydrocarbon radicals ranging from $C_8H_{17}$ to $C_{32}H_{65}$, the moiety $(C_6H_{10}O_5)$ represents a glycosyl unit; $m$ is at least 2 but averages 3 or more up to about 20, preferably only to about 5; and one of the glycosyl units is connected through its number one carbon atom to the alkoxyl group, RO—; $n$ is a positive number up to about 25, generally only to about 10, while $p$ is zero; $p$ is a positive number up to about 25, generally only to about 10, while $n$ is zero; $n+p$ is a number up to 50; and the

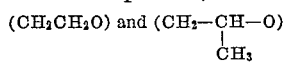

moieties are in blocks or randomly distributed along the polymer chain.

An object of the invention is the preparation of surface active compositions comprising mixtures of alkylene oxide adducts of alkyl oligosaccharides, alkyl glucosides and alkanols. Alkylene oxide adducts of higher alkyl oligosaccharides are highly effective hydrotropes for alkylene oxide adducts of alkyl glucosides and for similar adducts of mixtures of alkyl glucosides and alkanols. They are readily soluble in strongly alkaline solutions, thus facilitating the formulation of surface active materials in highly alkaline liquid systems. The adducts of the alkyl oligosaccharides, as well as mixtures thereof with alkyl glucosides, alkanols, or alkylene oxide adducts of the glucosides and the alkanols are also useful as textile detergents, particularly in alkaline systems.

These compounds are also useful as corrosion inhibitors for aluminum in alkaline cleaning systems.

It should be understood that the components of the novel mixtures can be prepared in accordance with the present invention and may vary as follows. For each 100 parts by weight of the surface active mixture there may be present:

(a) from 0 to 50 parts of a compound having the structure ROH, where R is selected from the group consisting of aliphatic hydrocarbon radicals ranging from $C_8H_{17}$ to $C_{32}H_{65}$;

(b) from 0 to 50 parts of a compound having the structure

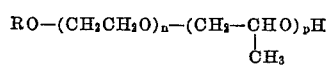

where R is as in (a) above, $n$ is a positive number up to 25, when $p$ is zero; $p$ is a positive number to about 25 when $n$ is zero, $n+p$ is a number up to about 50, and

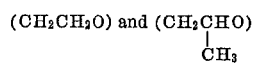

are in blocks or randomly distributed along the polymer chain;

(c) from 10 to 70 parts of a glycoside having the structure

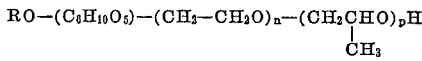

where R is the same as in (a) above, where $(C_6H_{10}O_5)$ is a glycosyl moiety which is connected to the RO through its first carbon atom; and where $n$ and $p$ are the same as in (b) above.

(d) from 20 to 90 parts of an alkylene oxide adduct of an alkyl oligosaccharide—whose components have a structure of the formula

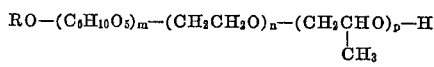

wherein R is selected from the group consisting of aliphatic hydrocarbon radicals ranging from $C_8H_{17}$ to $C_{32}H_{65}$, the moiety $(C_6H_{10}O_5)$ represents a glycosyl unit, $m$ is at least 2 but averages at least 3 up to about 20, and one of the glycosyl units is connected through its number one carbon atom to RO; $n$ is a positive number to 25, while $p$ is zero; $p$ is a positive number to 25, when $n$ is zero; and $n+p$ is a number up to 50, and the

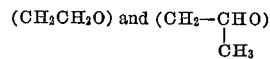

moieties are in blocks or randomly distributed along the polymer chain.

It should be understood that components (a), (b), (c), and (d) are present in variable ratios to each other as stated. Those ranges are not absolute, however, for there may be present inert materials, such as unreacted lower alkyl glucosides, lower alkyl oligosaccharides, and undistilled lower alkanol which make up the balance of the mixture.

The process by which our novel compositions are prepared may generally be described as follows: a lower alkyl glucoside, preferably butyl glucoside, is prepared by a conventional Fischer-type reaction using from 1 to 12 mols of the lower alkanol per mol of glucose. An acid catalyst is employed in the amount of from about 0.0005 mol per mol of glucose to about 0.05 mol/mol of glucose. The preferred catalyst is $H_2SO_4$, although HCl, $HNO_3$, p-toluene-sulfonic acid, methanesulfonic acid, and other acid, electron-accepting compounds of the group generally classed as "Lewis acids," may be employed. If sulfuric acid is employed as a catalyst it is preferred to use from 0.1 to 2.0 g./mol glucose (0.001 to 0.02 mol/mol glucose). If butanol or other lower alkanol is employed the preferred amount would be from 2 to 6 mols/mol glucose. The reaction is carried out at or above room temperature, preferably from 80 to 120° C., by refluxing until the mixture is clear and the glucose is in solution. Alternatively, the water of reaction may be removed during the reflux either by distillation with or without a reflux splitter or by azeotropic separation using hexane, heptane, or other such azeotroping agents.

When conversion of the glucose to butyl glucoside has taken place, or when the reaction mixture is clear, the higher alcohol ($C_8$ to $C_{32}$) is added and the excess lower alkanol removed, the removal operation being facilitated by reducing the pressure, in order to speed the distillation and keep the distillation temperature from getting too high. The amount of higher alcohol added generally will be from 0.5 to 4.0 mols/mol glucose, it being dependent upon the final composition desired, the average molecular weight of the higher alkyl oligosaccharides which are formed being inversely proportional to the amount of the higher alcohol used. That is, oligomers with relatively high molecular weights are formed when the mol ratio of alcohol to glucose is relatively low, and vice versa.

When the higher alcohol has been added, and the excess lower alcohol has been removed, an alcohol interchange reaction (transacetalation), already started, is continued by holding the reaction mixture at elevated temperatures under vacuum (if desired) so as continually to remove the lower alkanol as it and the higher alkyl glucosides and oligosaccharides are formed. The extent to which the lower alkyl glucosides and oligosaccharides are converted to higher alkyl glucosides and oligosaccharides is controlled by the amount of lower alcohol removed. The extent of reaction can be determined by a vapor phase chromatographic method of a sample at any time. The composition of both the adduct precursor and the final product is a result not only of the amount of higher alcohol used, but also the extent of the transacetalation reaction. The final composition relates to the number of moles of alkylene oxide incorporated per mole of glycoside or oligosaccharide.

At some low mol ratios of the higher alcohols to glucose it may be desired to terminate the interchange reaction even through appreciable amounts of butyl (or other lower alkyl) glycosides remain. This can insure a final product having a lower viscosity and melting point, than would be obtained if the interchange reaction were carried further. At higher mol ratios it is often desirable to continue the reaction further in order to obtain more "active" ingredient in the final product composition. Thus, the adduct precursors may contain varying amounts of butyl glycosides which, although they do not contribute significantly to surface activity, in some cases they do provide desirable physical properties.

The relative amounts of the various components of the alcohol, alkyl glucoside and alkyl oligosaccharide compositions which are formed are thus determined by the mol ratio of alcohol/glucose and the extent of the transacetalation reaction. Thus, it is possible to control the nature of the precursors of the invention, so as to produce compositions with properties that are suitable for the intended end use of the product of the invention.

For example, increased higher alcohol content lowers the precursor solubility in water and in alkaline solutions, but may cause an improvement in its oil solubility, or at least lower its viscosity, so that it will be highly useful for oxyalkylation to yield a product useful in a lubricating oil or cosmetic formulation.

Materials with relatively high oxyalkylated alkyl glucoside content exhibit good textile detergency, although they may not be as soluble in alkaline solutions, nor as good hydrotropes for other nonionic surfactants as those containing less oxyalkylated alkyl glucoside and more oxyalkylated alkyl oligosaccharide.

Generally, the introduction of a lower alkylene oxide, like ethylene oxide, into a hydroxylic organic material, tends to increase hydrophilicity. Surprisingly, and rather usefully, the introduction of alkylene oxides into the precursors described herein can give products which have greater hydrophobicity than the precursors in solutions containing electrolytes such as sodium hydroxide. This is of value in providing surfactants for the presently disclosed uses.

The adducts of this invention are made by treating the precursor with alkylene oxides, at temperatures ranging from 100° C., to 200° C., and employing base catalysts to minimise acid decomposition of the saccharides. Base catalysts employed are those such as NaOH, $Na_2CO_3$, NaOMe, amines, and the like.

Among the oxides that can be employed are ethylene oxide, propylene oxide, butylene oxide, styrene oxide, and even longer chain ($C_8$–$C_{16}$) epoxides, limited only by their ability to react with the alkyl saccharides.

In determining or controlling the properties of the precursor, an important factor is the length of the hydrophobe in relation to the number of condensed glucoside units. Any variation in the structure of the product may have an effect on its hydrophilicity and hydrophobicity. Thus, it might be possible to prepare two different materials with properties which are similar in some respect. A mixture containing a relatively large amount of lauryl glucoside may have solubility properties that are similar to a mixture containing a relatively large amount of a $C_{24}$ disaccharide. Variation in solubility may then result upon oxyalkylation.

It is apparent, in the compositions described above, that to obtain a mixture of alkyl oligosaccharide adducts, in which the R group differs from that of the alkyl glucoside and alkanol adducts, the alkyl oligosaccharides would have to be isolated separately, and transacetalated with the appropriate alcohol prior to oxyalkylation. They may then be re-combined with the alkyl glucoside-alkanol mixture, or employed separately.

Examples of primary alcohols, either straight or branched chain, useful in preparing the compositions of the present invention are octyl alcohols, decyl alcohols, dodecyl alcohols, tridecyl alcohols, tetradecyl alcohols, hexadecyl alcohols, octadecyl alcohols, eicosanyl alcohols, docosanyl alcohols, and tetracosanyl alcohols and their mixtures.

The prior art has known of alkyl oligosaccharides, but they have been of distinctly different structures from the compositions of the present invention, and their properties have been quite different, too. For example, Matsubara (Bull. Chem. Soc. Japan 34, 718 (1961) (C.A. 56, 8823) describes the preparation of alkyl maltosides by warming a solution of maltose in an aliphatic alcohol containing 0.1% HCl, the alcohols ranging from methyl to isoamyl. These maltosides are not surface active. Moreover, R ranges from $C_1$ to $C_5$, in contrast with the values for R in the present invention which range from $C_8$ to $C_{32}$. The value for $m$ in these maltosides is 2, but unlike the critical requirement for the compositions of the present invention the value for $m$ does not average at least 3. These are not oxyalkylated.

In U.S. Pat. 3,215,636, there is described the oxyalkylation of certain oligosaccharides with alkylene oxides, for example, saccharose is reacted with propylene oxide, in basic media, to form the polyglycol ether of saccharose. Such compounds do not have surface active properties such as those demonstrated by the present invention.

By contrast, the novel non-ionic compositions of the present invention are highly surface active agents, being easily tailored for use in solutions of widely differing electrolyte concentrations. Moreover, they show good compatibility with alkaline solutions, making them useful in metal cleaning, where highly alkaline (metal corrosive) solutions are indicated, because normally nonionic surfactants are inadequately soluble for this task.

The following examples are presented to demonstrate the several embodiments of the present invention and are not intended as limitations thereon.

EXAMPLE 1

Preparation of ethylene oxide adducts of lauryl glucoside-lauryl oligosaccharide-lauryl alcohol mixture (A) A mixture of 720 parts of glucose, 1779 parts of n-butanol, and 8 parts of concentrated sulfuric acid was stirred and refluxed at 100–110° C. in a flask with an attached water separator using hexane to cause the water to separate in the trap. After the theoretical amount of water was collected (18 parts/180 parts glucose) there was added 2132 parts of lauryl alcohol and the excess butanol was removed by distillation. The alcohol interchange, in which the lauryl alcohol reacted with the butyl glycosides while the butanol of reaction was distilled from the flask, was followed by vapor phase chromatography of the trimethylsilyl derivatives. At completion of the interchange the reaction mixture was neutralized with sodium hydroxide solution.

A 250 part portion of this was subjected to distillation up to a pot temperature of 145° C. at 10 mm. Hg. The distillate (lauryl alcohol) was 117 parts and the residue was 133 parts. A 10 part sample of the residue was removed for analysis and evaluation. The distillation was then continued to a pot temperature of 150° C. while another 22 parts of distillate was removed. The residual product of 98 parts of a lauryl alcohol, lauryl glucoside, lauryl oligosaccharide mixture was submitted for evaluation as a textile detergent and found by analysis to have the following composition:

| | Percent |
|---|---|
| Lauryl alcohol | 20.5 |
| Lauryl glucoside | 41 |
| Lauryl disaccharide | 14 |
| Lauryl trisaccharide | 9 |
| Lauryl tetrasaccharide | 7 |
| Lauryl pentasaccharide | 5 |
| Higher lauryl oligosaccharides (by difference) | 3.5 |

(B) Another mixture, prepared along the lines of Part A, but containing about 20% ROH, 15 to 25% $RO(R_6H_{10}O_5)H$, 30 to 40% $RO(C_6H_{10}O_5)_m$—H, and 15 to 35% butyl glycosides, was oxyethylated using different amounts of ethylene oxide. The composition of the adducts, as measured by percent condensed ethylene oxide (E.O.), is indicated below.

The E.O. was added at 180–190° C., using 1.0 g. of 50% NaOH catalyst for each 100 g. of starting mixture. The cloud points of the resulting adducts were measured in aqueous solution, and found to be correlatable to the amount of ethylene oxide added.

| Percent condensed E.O. in product: | 1% solution cloud point, ° C./percent NaOH |
|---|---|
| 32.8 | >100/0 |
| 43.7 | >100/0 |
| 52.0 | >100/0 |
| 64.4 | 90–100/0 |
| 69.3 | 83/0 |

EXAMPLE 2

Preparation of ethylene oxide adducts of a mixture of alcohols, alkyl glucosides and alkyl oligosaccharides in which the alkyl group of each component is a mixture of $C_{12}H_{25}$ and $C_{13}H_{27}$ A mixture of 270 parts of glucose, 294 parts of butanol, about 4 parts of hexane, and 0.25 part of concentrated sulfuric acid was stirred and refluxed while 27 parts water was collected in a water separator. There was added 291 parts of a mixture of alkanols comprised predominantly of about equal parts of n-dodecanol and n-tridecanol. The mixture was held at 100–110° C./10 millimeters of mercury while butanol was removed by distillation and the alcohol interchange reaction was taking place. The mixture was then neutralized with 1.5 parts of 50% sodium hydroxide solution.

A portion of the reaction mixture (resulting from the alcohol interchange) was stripped of excess alcohol so that it contained about 1 part of ROH, 20–30 parts of $RO(C_6H_{10}O_5)H$, about 40–50 parts of $$RO(C_6H_{10}O_5)_m\text{—H}$$

and about 20–40 parts of butyl saccharides. It was then oxyalkylated by the procedure of Example 1, using different amounts of

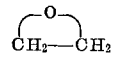

and the cloud points of the resulting adducts were measured.

| Percent condensed E.O. in product: | 1% solution cloud point, ° C./percent NaOH |
|---|---|
| 8.25 | >100/50 |
| 18.2 | >100/45, 0–5/50 |
| 30.6 | >100/25, 76/30 |
| 40.0 | 81/20, 21/30 |
| 46.9 | 50/20 |
| 57.0 | 75/10 |
| 63.8 | 63/10 |

EXAMPLE 3

A mixture of saccharides prepared according to the procedure of Example 2, but now containing about 20% of the starting alkanols, 15 to 25% of higher alkyl glucosides, 30 to 40% higher alkyl oligosaccharide, and 15 to 35% butyl glycosides was oxyethylated by the procedure of Example 1, using different amounts of

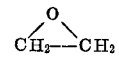

and the cloud points measured:

| Percent condensed E.O. in product: | 1% solution cloud point, ° C./percent NaOH |
|---|---|
| 35.7 | >100/0, 74/1 |
| 45.4 | >100/0, 85/1, 79/5 |
| 55.0 | 89/0, 79/1, 67/5 |
| 64.7 | 86/0, 63/5, 35/10 |

EXAMPLE 4

Another mixture of saccharides prepared according to Example 2 and containing 40% of the starting alkanols, 10 to 20% higher alkyl glucosides, 20 to 30% of higher alkyl oligosaccharides, and 10 to 30% butyl glycosides were oxyethylated per Example 1, using different amount of $(CH_2CH_2O)$ and the cloud points measured.

| Percent condensed E.O. in product: | 1% solution cloud point, ° C./percent NaOH |
|---|---|
| 25.5 | <0/1, 10 |
| 35.7 | <0/1, 10 |
| 45.5 | <0/0, 10 45–55/1 |
| 55.0 | 50–60/0, 1 |
| 64.9 | 59/1, 53/5, 0/10 |

EXAMPLE 5

A mixture of 1.0 g. of 50% sodium hydroxide solution and 241.7 g. of mixture containing about 60% lauryl alcohol, 15–20% lauryl glucoside, 15–20% lauryl oligosaccharides, and 5–10% butyl saccharides was maintained at 150°/20 mm. Hg until the residue weighed 95.9 g. and most of the lauryl alcohol was removed. To the residue was added 19.3 g. of propylene oxide in the conventional manner to give a product containing about 17% condensed propylene oxide.

EXAMPLE 6

A mixture of 1.0 g. of 50% sodium hydroxide solution and 258.6 g. of a 70% aqueous solution of a mixture of $C_8$–$C_{10}$ alcohol, $C_8$–$C_{10}$ alkyl glucoside, and $C_8$–$C_{10}$ alkyl oligosaccharides, was stripped to dryness at 100–110° C., using toluene and isopropanol to cut the foam. To the residue of 173.7 g. was added at 180–190° C., 21.8 g. of ethylene oxide to give a product containing about 11% of condensed ethylene oxide.

The resulting mixture of adducts may be treated with organic solvents such as acetone, to separate out unreacted oligosaccharides and their adducts.

EXAMPLE 7

To 153.3 g. of a mixture containing about 40% of octanol and deconol, 30% of octyl and decyl glucosides, and 30% of octyl, and decyl oligosaccharides was added 22.0 g. of ethylene oxide, using sodium hydroxide as the catalyst. The product contained about 12.5% of condensed ethylene oxide.

Other adducts were prepared from the same saccharide mixture to give materials containing 23.0% and 29% of condensed ethylene oxide.

EXAMPLE 8

Ethylene oxide adducts of mixtures of lauryl alcohol, lauryl glucoside, lauryl oligosaccharides; ethylene oxide adducts of mixtures of octyl and decyl alcohols, glucosides, and oligosaccharides; and a propylene oxide adduct derived from octyl and decyl alcohols, glucosides, and oligosaccharides, were all demonstrated to be far better metal cleaners than similar non-oxyalkylated glucoside-oligosaccharide-alkanol mixtures.

For example, using 0.25% candidate surfactant in an alkaline bath[1] at 60° to remove mineral oil from mild steel panels, the adduct mixtures of this invention were from 10 to 18 times more efficient than a control alkaline bath lacking a surfactant, and considerably more efficient than non-oxyethylated mixtures of alkyl glucosides, alkyl oligosaccharides and alkanols, as tabulated below:

TABLE 1

| Candidate surfactant: | Surfactant activity (percent detergency) |
|---|---|
| (a) Ethylene oxide adduct of a mixture of n-octyl and n-decyl glucosides, oligosaccharides and alcohols (4.8 moles E.O. added) | 41 |
| (b) Propylene oxide adduct of a mixture of n-octyl and n-decyl glucosides, oligosaccharides and alcohols (1 mole P.O. per mole of glycoside) | 54 |
| (c) Mixture of dodecyl glucoside, dodecyl oligosaccharide and dodecyl alcohol | 4 |
| (d) Ethylene oxide adduct of (c) above (one mole E.O. for each glycosyl unit) | 30 |
| (e) Ethylene oxide adduct of (c) above (4.4 mole E.O. for each glycosyl unit) | 45 |
| (f) No surfactant in bath | 3 |

It is, of course, well known that the stated number of moles of condensed alkylene oxide in an A.O. adduct is an average number. Such adducts are mixtures which do, in fact, contain some individual species with a greater number, than the average, of moles of condensed A.O. units, and some species have a smaller number of moles of condensed A.O. units.

For example, it is entirely possible that the mixture listed as surfactant in (a) in Table 1 above could contain some molecules with no condensed ethylene oxide units, as well as containing some molecules with as many as 10 condensed ethylene oxide units. Further, materials such as some of those described in Examples 1 through 4 could contain adduct species with as many as 25 condensed eth-

[1] Bath composition is 2% in water of a mixture of 35 parts sodium metasilicate, 20 parts tetrasodium pyrophosphates, 15 parts sodium hydroxide, and 30 parts sodium carbonate.

ylene oxide units. Similarly so, with propylene oxide adducts of this invention, which form like adducts having a variable number of P.O. units.

EXAMPLE 9

A series of tests demonstrating the utility of certain compositions of this invention was conducted by exposing samples of aluminum foil to solutions of 0.5% NaOH, 0.028% CaO, and the various surfactants as indicated in Table 2 below, at 0.5% surfactant. As will be noted when the surfactants of the present invention were used a satisfactory resistance to corrosion took place, whereas with the other surfactants the corrosive attack was excessive beyond normal acceptable limits.

TABLE 2

Surfactant composition:   Corrosion of aluminum by NaOH solution at 60° in mils per year

| | |
|---|---|
| (1) Mixture of glucosides, oligosaccharides, and alkanols derived from n-$C_8H_{17}$–$C_{10}H_{21}$ alcohols and subsequently oxyethylated with one ethoxy unit/glycosyl unit | <5 |
| (2) Mixture of glucosides, oligosaccharides, and alkanols derived from n-$C_8H_{17}$–$C_{10}H_{21}$ alcohols and subsequently oxyethylated with two units | 510 |
| (3) Glucose standard | 4,200 |

We claim:

1. A surface-active alkyl oligosaccharide-alkylene oxide adduct having the formula

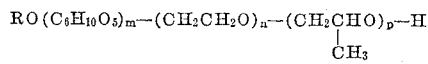

wherein R is selected from the group consisting of saturated aliphatic hydrocarbon radicals ranging from $C_8H_{17}$ to $C_{32}H_{65}$, the moiety ($C_6H_{10}O_5$) represents a glycosyl unit, $m$ is at least 2 but averages 3 to about 20; and one of the glycosyl units is connected through its number one carbon atom to RO—; $n$ is a positive number up to 25 while $p$ is zero, $p$ is a positive number up to 25 while $n$ is zero; and $n+p$ is a number up to 50, and the

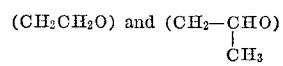

moieties are in blocks or randomly distributed along the polymer chain.

2. The composition of claim 1 in which R is a mixture of $C_8H_{17}$, and $C_{10}H_{21}$, $m$ is as defined above, $n$ is a number up to about five, and $p$ is zero.

3. The composition of claim 1 in which R is a mixture of $C_{12}H_{25}$, and $C_{13}H_{27}$, $m$ is as defined above, $n$ is a number up to above five, and $p$ is zero.

4. The composition of claim 1 in which R is $C_{12}H_{25}$, $m$ and $n$ are as defined therein, and $p$ is zero.

5. The composition of caim 1 in which R is $C_{12}H_{25}$, $m$ and $p$ are as defined therein, and $n$ is zero.

6. A surface active mixture consisting essentially of alkylene oxide adducts of alkyl oligosaccharides, alkylene oxide adducts of alkyl glucosides, alkylene oxide adducts of alkanols, and alkanols, the surface active ingredients of which mixture, for each 100 parts by weight present, comprise:

(a) from 0 to 50 parts of a compound having the structure ROH, where R is a member of the group consisting of aliphatic hydrocarbon radicals ranging from $C_8H_{17}$ to $C_{32}H_{65}$;

(b) from 0 to 50 parts of a compound having the structure

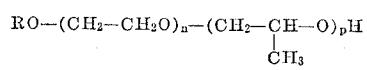

where R is as above, $n$ is a positive number up to 25, when $p$ is zero; $p$ is a positive number to about 25 when $n$ is zero; $n+p$ is a number up to about 50, and $$(CH_2CH_2O) \text{ and } (CH_2\underset{\underset{CH_3}{|}}{C}HO)$$

are in blocks or randomly distributed along the polymer chain;

(c) from 10 to 70 parts of a *glycoside* having the structure $$RO-(C_6H_{10}O_5)-(CH_2CH_2O)_n-CH_2\underset{\underset{CH_3}{|}}{C}HO)_pH$$

where R is the same as in (a) above, where $(C_6H_{10}O_5)$ is a glycosyl moiety which is connected to the RO through its first carbon atom; and where $n$ and $p$ are the same as in (b) above;

(d) from 20 to 90 parts of an alkyl oligosaccharide-alkylene oxide adduct mixture whose components have a structure of the formula $$RO(C_6H_{10}O_5)_m-(CH_2CH_2O)_n-(CH_2\underset{\underset{CH_3}{|}}{\overset{\overset{H}{|}}{C}}-O)_p-H$$

where R is a member of the group consisting of aliphatic hydrocarbons radicals ranging from $C_8H_{17}$ to $C_{32}H_{65}$, the moiety $(C_6H_{10}O_5)$ represents a glycosyl unit, $m$ is at least 2 but averages at least 3 to about 20, and one of the glycosyl units is connected through its number one carbon atom to RO—; $n$ is a positive number up to 25 while $p$ is zero; $p$ is a positive number up to 25, when $n$ is zero; and $n+p$ is a number up to 50, and the $$(CH_2CH_2O) \text{ and } (CH_2-\underset{\underset{CH_3}{|}}{\overset{\overset{H}{|}}{C}}-O)$$

moieties are in blocks or randomly distributed along the polymer chain.

7. The mixture of claim 6 in which R is a mixture of $C_8H_{17}$ and $C_{10}H_{21}$, $m$ is as defined above, $n$ is a number up to about five, and $p$ is zero.

8. The mixture of claim 6 in which R is a mixture of $C_{12}H_{25}$ and $C_{13}H_{27}$, $m$ is as defined above, $n$ is a number up to about five, and $p$ is zero.

9. The mixture of claim 6 in which R is $C_{12}H_{25}$, $m$ and $n$ are as defined therein, and $p$ is zero.

10. The mixture of claim 6 in which R is $C_{12}H_{25}$, $m$ and $p$ are as defined therein and $n$ is zero.

References Cited
UNITED STATES PATENTS

| | | | |
|---|---|---|---|
| 3,219,656 | 11/1965 | Boettner | 260—210 |
| 3,324,108 | 6/1967 | Moller et al. | 260—210 |
| 3,370,056 | 2/1968 | Yotsuzuka et al. | 260—210 |
| 3,450,690 | 6/1969 | Gibbons et al. | 260—210 |

LEWIS GOTTS, Primary Examiner

J. R. BROWN, Assistant Examiner

U.S. Cl. X.R.

252—8.9, 351, 396, 407